US008636560B2

United States Patent
Grumbine et al.

(10) Patent No.: US 8,636,560 B2
(45) Date of Patent: Jan. 28, 2014

(54) WIRESAW APPARATUS AND METHOD FOR CONTINUOUS REMOVAL OF MAGNETIC IMPURTIES DURING WIRESAW CUTTING

(75) Inventors: Steven Grumbine, Aurora, IL (US); Ramasubramanyam Nagarajan, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 308 days.

(21) Appl. No.: 13/133,784

(22) PCT Filed: Dec. 21, 2009

(86) PCT No.: PCT/US2009/068901
§ 371 (c)(1),
(2), (4) Date: Jun. 9, 2011

(87) PCT Pub. No.: WO2010/071868
PCT Pub. Date: Jun. 24, 2010

(65) Prior Publication Data
US 2011/0240001 A1    Oct. 6, 2011

Related U.S. Application Data

(60) Provisional application No. 61/203,144, filed on Dec. 20, 2008.

(51) Int. Cl.
*B28D 1/08* (2006.01)

(52) U.S. Cl.
USPC .......... 451/53; 451/450; 125/16.02; 125/21

(58) Field of Classification Search
USPC .................. 451/449, 450, 53; 125/21, 16.02
See application file for complete search history.

(56) References Cited

U.S. PATENT DOCUMENTS

| 6,443,143 B1 * | 9/2002 | Ishida et al. | 125/16.02 |
| 6,505,394 B2 * | 1/2003 | Ishida et al. | 29/557 |
| 6,837,778 B2 * | 1/2005 | Kondo et al. | 451/49 |

* cited by examiner

*Primary Examiner* — Robert Rose
(74) *Attorney, Agent, or Firm* — Thomas E Omholt; Steven D Weseman

(57) ABSTRACT

The invention provides a method and apparatus for removing magnetic or magnetized contaminants from a wiresaw cutting slurry during a wiresaw cutting process. The apparatus comprises a recirculating slurry dispensing system that defines the slurry flow pathway. The recirculating dispensing slurry system comprises a magnetic separator for removing magnetic or magnetizable contaminants from the slurry, wherein the purified slurry is discharged back into recirculation within the recirculating slurry dispensing system.

15 Claims, 14 Drawing Sheets

1300. recirculating slurry dispensing system
1302. mount and support head
1304. workpiece
1305. application region
1306. wiresaw
1307. wiresaw slurry egress region
1310. magnetic separator
1315. tank ingress
1316. slurry tank
1317. tank egress
1320. separator inlet
1322. separator outlet
1330. heat exchanger
1340. exchanger inlet
1342. exchanger outlet
1380. heat exchanger slurry loop
1390. ingress to heat exchanger slurry loop
1392. egress to heat exchanger slurry loop 100. recirculating slurry dispensing system
102. mount and support head
104. workpiece
105. application region
106. wiresaw
107. wiresaw slurry egress region
108. collector
109. collector outlet
110. magnetic separator
111. pump inlet
112. pump
113. pump outlet
115. slurry tank ingress
116. slurry tank
117. slurry tank egress
120. separator inlet
122. separator outlet
130. heat exchanger
140. exchanger inlet
142. exchanger outlet 200. recirculating slurry dispensing system
202. mount and support head
204. workpiece
205. application region
206. wiresaw
207. wiresaw slurry egress region
210. magnetic separator
220. magnetic separator inlet
222. magnetic separator outlet 300. recirculating slurry dispensing system
302. mount and support head
304. workpiece
305. application region
306. wiresaw
307. wiresaw slurry egress region
310. magnetic separator
318. diverter
320. separator inlet
322. separator outlet
324. junction 400. recirculating slurry dispensing system
402. mount and support head
404. workpiece
405. application region
406. wiresaw
407. wiresaw slurry egress region
410. magnetic separator
418. diverter
420. separator inlet
422. separator outlet
424. junction 500. recirculating slurry dispensing system
502. mount and support head
504. workpiece
505. application region
506. wiresaw
507. wiresaw slurry egress region
510. magnetic separator
514. valve
515. valve
516. splitter
520. separator inlet
521. separator inlet
522. separator outlet
523. separator outlet
526. combiner 600. recirculating slurry dispensing system
602. mount and support head
604. workpiece
605. application region
606. wiresaw
607. wiresaw slurry egress region
610. magnetic separator
611. magnetic separator
620. separator inlet
621. separator inlet
622. separator outlet
623. separator outlet 700. recirculating slurry dispensing system
702. mount and support head
704. workpiece
705. application region
706. wiresaw
707. wiresaw slurry egress region
708. collector
709. collector outlet
710. magnetic separator 800. recirculating slurry dispensing system
802. mount and support head
804. workpiece
805. application region
806. wiresaw
807. wiresaw slurry egress region
808. collector
809. collector outlet
810. magnetic separator
815. tank ingress
816. slurry tank
817. tank egress
820. separator inlet
822. separator outlet 900. recirculating slurry dispensing system
902. mount and support head
904. workpiece
905. application region
906. wiresaw
907. wiresaw slurry egress region
910. magnetic separator
915. tank ingress
916. slurry tank
917. tank egress 1000. recirculating slurry dispensing system
1002. mount and support head
1004. workpiece
1005. application region
1006. wiresaw
1007. wiresaw slurry egress region
1010. magnetic separator
1020. separator inlet
1022. separator outlet
1030. heat exchanger
1040. exchanger inlet
1042. exchanger outlet 1200. recirculating slurry dispensing system
1202. mount and support head
1204. workpiece
1205. application region
1206. wiresaw
1207. wiresaw slurry egress region
1210. magnetic separator
1215. tank ingress
1216. slurry tank
1217. tank egress
1220. separator inlet
1222. separator outlet
1250. separator slurry loop
1260. ingress to separator slurry loop
1262. egress to separator slurry loop

FIG. 14

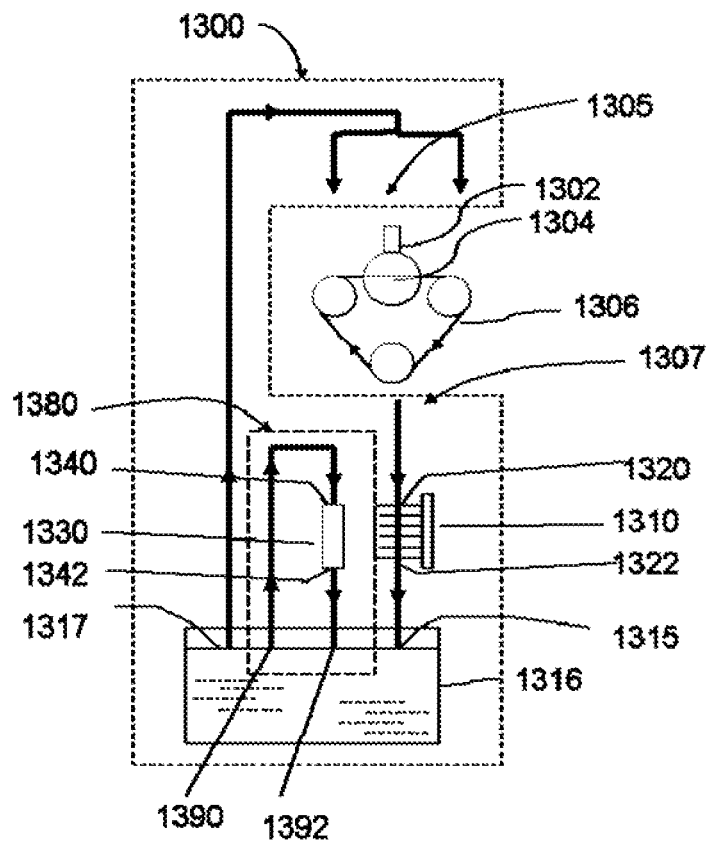

1300. recirculating slurry dispensing system
1302. mount and support head
1304. workpiece
1305. application region
1306. wiresaw
1307. wiresaw slurry egress region
1310. magnetic separator
1315. tank ingress
1316. slurry tank
1317. tank egress
1320. separator inlet
1322. separator outlet
1330. heat exchanger
1340. exchanger inlet
1342. exchanger outlet
1380. heat exchanger slurry loop
1390. ingress to heat exchanger slurry loop
1392. egress to heat exchanger slurry loop

WIRESAW APPARATUS AND METHOD FOR CONTINUOUS REMOVAL OF MAGNETIC IMPURTIES DURING WIRESAW CUTTING

CROSS-REFERENCE TO RELATED APPLICATIONS

This application claims the benefit of U.S. Provisional Application for Patent Ser. No. 61/203,144, filed on Dec. 20, 2008, which is incorporated herein by reference.

FIELD OF THE INVENTION

This invention pertains to methods for removing magnetic or magnetized contaminants produced during a wiresaw cutting process.

BACKGROUND OF THE INVENTION

Wiresaw cutting is the dominant method for slicing ingots into thin wafers for use in the integrated circuits and photovoltaics (PV) industries. This method is also commonly used for wafering substrates of other materials, such as sapphire, silicon carbide, or ceramic substrates. A wiresaw typically has a web of fine metal wires, or a wireweb, where the individual wires have a diameter around 0.15 mm and are arranged parallel to each other, at a distance of 0.1 to 1.0 mm, through a series of spools, pulleys and wire guides. Slicing, or cutting, is accomplished by contacting the workpiece (e.g. an ingot) with a moving wire to which an abrasive slurry has been applied.

Conventional wiresaw abrasive slurries typically comprise a carrier and abrasive particles combined by mixing in a ratio of about 1:1 by weight. The carrier is a liquid that provides lubrication and cooling, such as a mineral oil, kerosene, polyethylene glycol, polypropylene glycol or other polyalkylene glycols. The liquid carrier also holds the abrasive to the wire so that the abrasive can contact the workpiece. The abrasive is typically a hard material such as silicon carbide particles.

The wiresaw cutting process is a batch process in which a fixed volume of slurry is continuously recycled from a holding tank and supplied using nozzles to the wireweb close to the workpiece being cut. During the process, the waste material from the cut, including the kerf, gradually accumulates in the slurry, which eventually loses performance. The exhausted slurry is treated and separated into its constituents (i.e. abrasive and carrier). Reclaiming is essential to the economics of the operation.

One component of the spent slurry is magnetic or magnetizable impurities that are generated primarily through wire wear produced during the wiresaw cutting process. Such impurities can interact with components in the slurry and the kerf matter, leading to viscosity changes, pH changes, temperature changes, decomposition of additives, particle size distribution changes or other changes to the slurry. The accumulation of magnetic or magnetizable impurities therefore leads to the degradation of the cutting performance over time.

U.S. Pat. No. 6,264,843 describes a batch process for reclaiming a cutting fluid suspension produced during machining. The described process separates the abrasive containing fraction first and then uses a magnetic separator to remove abraded material. The recovered fluid is then reconstituted with fresh slurry and returned to the cutting process.

U.S. Pat. No. 6,443,143 describes a method of cutting a rare earth alloy using an abrasive free cutting fluid. In the described process kilogram quantities the rare earth alloy kerf matter is removed using centrifugation and a magnetic separator. Because there is no abrasive contained in the spent fluid, the process is designed to remove large quantities of solids.

Although the batch process is acceptable to the industry, changing the slurry slows the wiresaw cutting process and requires more tool start ups that can be stressful on the equipment. Additionally, it is a difficult challenge to remove contaminants from spent cutting fluids containing relatively large quantities of abrasive materials and relatively small quantities of contaminants, without a costly batch process. It would therefore be advantageous to have a wiresaw cutting operation where the contaminant removal is continuous.

BRIEF SUMMARY OF THE INVENTION

The invention provides a method for removing magnetic or magnetized contaminants from a wiresaw cutting slurry during a wiresaw cutting process. The process comprises the steps of: applying an abrasive slurry to a moving wiresaw from a recirculating slurry dispensing system; cutting a workpiece with the moving wiresaw and the applied abrasive slurry; conveying used abrasive slurry from the workpiece back into the recirculating slurry dispensing system; sending at least a portion of the slurry through a magnetic separator to remove magnetic or magnetized contaminants from the slurry; and discharging the slurry sent through the magnetic separator back into circulation within the recirculating slurry dispensing system.

This invention also provides for a wiresaw cutting apparatus. The apparatus comprises a mount and support head adapted to hold a workpiece, a wiresaw positioned relative to the mount and support head such that the workpiece can be brought into contact with the wiresaw when in operation, an application region positioned and adapted for applying a wiresaw cutting slurry to the wiresaw from a recirculating slurry dispensing system, and a wiresaw slurry egress region adapted to direct slurry off of the wiresaw and mounted workpiece and back into a slurry flow pathway. The recirculating slurry dispensing system defines the slurry flow pathway. The recirculating dispensing system comprises a magnetic separator for removing magnetic or magnetizable contaminants from the slurry, wherein the magnetic separator comprises an inlet to allow at least of portion of slurry into the magnetic separator and an outlet to allow purified slurry to be discharged back into recirculation within the recirculating slurry dispensing system.

BRIEF DESCRIPTION OF THE DRAWING

FIG. 14. shows a wiresaw cutting apparatus with a magnetic separator wherein the recirculating slurry dispensing system includes a slurry tank and a heat exchanger slurry loop adapted to convey slurry from the slurry tank, through the heat exchanger and back to the slurry tank.

DETAILED DESCRIPTION OF THE INVENTION

The invention provides a method for removing magnetic or magnetized contaminants from a wiresaw cutting slurry during a wiresaw cutting process. The process comprises the steps of: applying an abrasive slurry to a moving wiresaw from a recirculating slurry dispensing system; cutting a workpiece with the moving wiresaw and the applied abrasive slurry; conveying used abrasive slurry from the workpiece back into the recirculating slurry dispensing system; sending at least a portion of the slurry through a magnetic separator to remove magnetic or magnetized contaminants from the slurry; and discharging the slurry sent through the magnetic separator back into circulation within the recirculating slurry dispensing system.

This invention also provides for a wiresaw cutting apparatus. The apparatus comprises a mount and support head adapted to hold a workpiece, a wiresaw positioned relative to the mount and support head such that the workpiece can be brought into contact with the wiresaw when in operation, an application region positioned and adapted for applying a polishing slurry to the wiresaw from a recirculating slurry dispensing system, and a wiresaw slurry egress region adapted to direct slurry off of the wiresaw and mounted workpiece and back into a slurry flow pathway. The recirculating slurry dispensing system defines the slurry flow pathway, and comprises a magnetic separator for removing magnetic or magnetizable contaminants from the slurry. The magnetic separator comprises an inlet to allow at least a portion of slurry into the magnetic separator and an outlet to allow processes slurry to be discharged back into recirculation within the recirculating slurry dispensing system.

Figure 1:
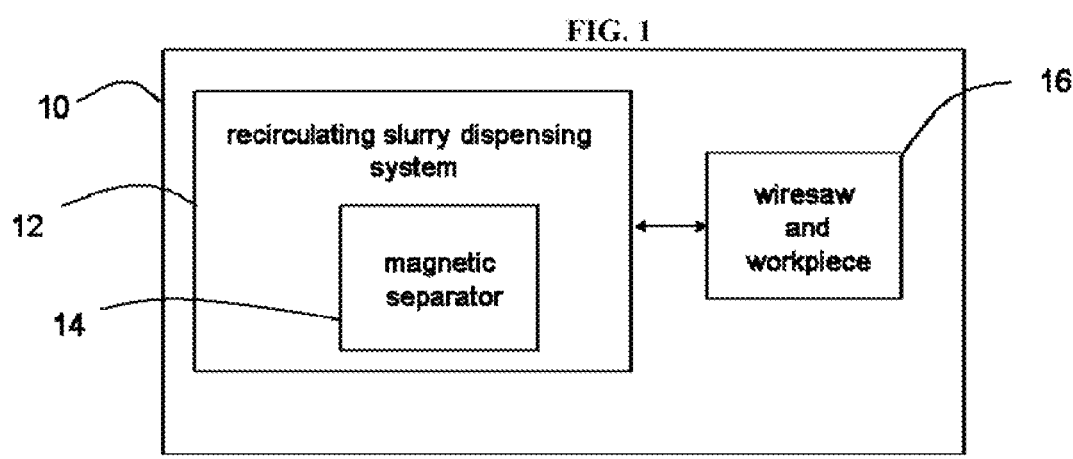
FIG. 1 shows some of the components used in the present invention.

FIG. 1 provides a schematic of various components of a wiresaw cutting system 10 used in the methods of the invention. A recirculating slurry dispensing system 12, as utilized in the present invention, comprises a magnetic separator 14. An abrasive slurry flows onto a wiresaw and workpiece 16, and then flows away from the wiresaw and workpiece 16 completing a slurry recycling loop using the recirculating slurry dispensing system 12.

The recirculating slurry dispensing system comprises a magnetic separator. The magnetic separator comprises at least one inlet (e.g., at least 2, at least 3 or at least 4) and at least one outlet (e.g., at least 2, at least 3 or at least 4) so that slurry can flow into and out of the interior of the magnetic separator. The interior of the separator comprises permanent magnets and/or electro magnets arranged to attract and hold magnetic or magnetized materials from the slurry as it flows through the separator. The inlet and outlet can comprise a continuous mesh such as a screen made of metal wires. For example, the inlet and outlet can comprise a continuous mesh in the shape of a basket defining an interior space wherein the magnets can be positioned. Preferably, the magnets are removable. Alternatively, the inlet outlet, and interior space may be completely integrated with other components of the recirculating slurry dispensing system. For example, the inlet, outlet and interior space may be one continuous tube in which the magnets are arranged to form the magnetic separator in the path of slurry flow. As another example, the inlet and outlet can be adapted to allow slurry to flow through a large inner space such as a tank or tub, and the magnets can be placed in the tank or tub via an access port or opening. The purpose of the magnetic separator is to at least partially retain magnetic or magnetized impurities that may be present in the abrasive slurry while other slurry components flow through the recirculating slurry dispensing system relatively unhindered. Some exemplary magnetic separators available commercially are the ELECTRO FERRO FILTER Model EVP/E (Magnet Industries Cal Pvt. Ltd.), PERMANENT FERRO FILTER Model PVP/R (Magnet Industries Cal Pvt. Ltd.), and SUPER B FERROUS TRAPS (Eriez Magnetics).

When the wiresaw cutting apparatus is in operation, the recirculating slurry dispensing system includes a flow of slurry in the direction indicated by arrow heads in FIGS. 2 to 11. Arrow heads on the schematic representation of the wiresaw indicate movement of the wiresaw. The direction of movement of the wiresaw may reverse during the operation of the wiresaw. The flow direction of slurry typically does not reverse during operation of the wiresaw. Within the recirculating dispensing system the flow may be diverted by a diverter or combined at a junction. A diverter allows slurry flow to enter one end and the total flow that enters is split into at least two separate slurry flows. A junction can combine more than one slurry flowing in the recirculating dispensing system into a single flow. For example, diverters and junctions can be T shaped or Y-shaped tubes through which slurry flows and is either spit from one flow to two or two flows are combined into one respectively.

The flow rate in the recirculating slurry dispensing system is typically in the range of about 2000 Kg/hr to about 8000 Kg/hr (e.g., about 3000 Kg/hr to 6000 Kg/hr). Depending on the specific embodiment, the flow rate through the magnetic separator can be 0% or greater (e.g., 10% or greater, 20% or greater, 30% or greater, 40% or greater, 50% or greater, 100% or greater, 200% or greater, 300% or greater, 400% or greater, or 500% or greater) of the recirculating slurry dispensing system flow rate. Depending on the specific embodiment, the flow rate through the magnetic separator is typically 1000% or less (e.g., 900% or less, 800% or less, 700% or less, 600% or less, 500% or less, 90% or less, 80% or less, 70% or less, 60% or less, or 50% or less) of the recirculating slurry dispensing system flow rate.

The recirculating slurry dispensing system can also include a collector. A collector is typically a surface that conveys slurry from the workpiece back into circulation within the recirculating slurry dispensing system. For example, the collector can be a container comprising an open top positioned to collect slurry flowing or dripping from the wiresaw and having an outlet or drain for the slurry to flow out of. The outlet can be located on the bottom, the sides, or can comprise a tube or siphon dipped into collected slurry from the top of the collector. The collector can be configured in many different ways. For example, the collector can be funnel-shaped, cone-shaped, pyramidal, or a half spherical shell. The collector can also be one or more surfaces angled to direct slurry to a slurry tank within the recirculating slurry dispensing system.

The recirculating slurry dispensing system can include a slurry tank and one or more pumps, if desired. A slurry tank provides a reservoir for the slurry and is typically situated upstream of a pump. The slurry tank typically has a stirrer or agitator to help prevent settling of solid components of the slurry during the operation of the tool or while the tool is idling.

The recirculating slurry dispensing system may include a heat exchanger. The heat exchanger can be situated at any point in the recirculating slurry dispensing system. The heat exchanger can also be in, around, or integrated with components such as the slurry tank, the collector, the pump and the magnetic separator. A typical configuration is for the heat exchanger to be located as a separate recirculation system including a separate pump where the separate recirculation system exchanges slurry within a slurry tank. The heat exchanger can be used to cool or heat the slurry. For example, heating the slurry can be used to lower the viscosity of the slurry if the viscosity is too high for proper operation of the wiresaw apparatus. Alternatively, for example, cooling the slurry can be used to raise the viscosity of the slurry if the viscosity is too low for proper operation of the wiresaw apparatus. The temperature of the slurry can also affect the rates of decomposition of slurry components. Decreasing or increasing the temperature of the slurry can also impact the kinetics of formation of magnetized agglomerates and thus the efficiency of the magnetic separator can be impacted by the use of a heat exchanger. Therefore, there is a desire to control the temperature of the slurry.

The recirculating slurry dispensing system may comprise one or more collectors, one or more slurry tanks, one or more pumps and one or more heat exchanger or any combination thereof. The recirculating slurry dispensing system may further comprise plumbing for conveying slurry between the various components. The plumbing typically includes a structure that constricts flow to one dimension, such as a tube or pipe. Where gravity allows the slurry to flow through the recirculating slurry dispensing system, the plumbing may comprise a more open structure such as a trough. The plumbing may even comprise an opening in a tube that allows the slurry to pour into another component of the recirculating slurry dispensing system such as a slurry tank. Alternatively, for example, the plumbing may consist of a trough in a portion of the recirculating slurry dispensing system where the flow is horizontal.

When the wiresaw apparatus of the invention is in operation, a workpiece secured to a mount and support head, is pressed against a moving wiresaw while slurry is supplied to the wiresaw. The wiresaw has two or more wire guide rollers, which have their axes arranged parallel to one another and around which a wire is guided one or more times. Typically, a wiresaw has three wire guide rollers and the wire is multiply guided around the wire guides creating a wire-web. Configurations having more than 3 wire guides can be used in the method of this invention. The wiresaw is moved by rotation of wire guide rollers which causes sections of wire to move in a longitudinal direction. The direction of movement can be changed during the operation or be in a constant direction. For example, the direction can oscillate from one direction to the next during the cutting process.

The wire used in the wiresaw of this invention can be made of any suitable material, as is known in the art. Typically, the wire has a thickness of about 0.01 mm or more (e.g., 0.05 mm or more, 0.1 mm or more, or 0.15 mm or more). Typically, the wire has a thickness of about 0.5 mm or less (e.g., 0.4 mm or less, 0.3 mm or less, 0.25 mm or less, or 0.2 mm or less). Typically, the wire is made of hard drawn steel. Alternatively the wire can be made of one or more alloys such as alloys containing Fe, Ni, Cr, Mo and/or W. Because the wire wears out during the cutting operation, the wear material is recirculated with and contaminates the slurry in the recirculating slurry dispensing system.

At least a portion of the slurry that has been applied to the wiresaw is sent through the magnetic separator to remove magnetic or magnetizable impurities from the slurry that may be present due to the wear of the wires of the wiresaw. As used herein and in the appended claims, the term "magnetic materials" encompasses those materials that exhibit permanent magnetism or are ferromagnetic, such as the ferrites hematite ($Fe_2O_3$) or magnetite ($Fe_3O_4$). The term "magnetizable material" encompasses those materials that exhibit paramagnetism, such as iron, and are therefore attracted to a magnetic field. Only a portion of the material removed by the magnetic separator need be magnetic or magnetizable. For example, a diamagnetic slurry component can be bonded to a magnetic or magnetizable impurity and the combination may be removed by the magnetic separator. Specifically, one or more abrasive particles can be agglomerated with magnetic or magnetizable impurities, and the agglomerate can be removed by the magnetic separator. Preferably magnetic materials comprise iron. Preferably, at least about 10 wt % (e.g., at least 20 wt %, at least 30 wt %, at least 40 wt %, or at least 50 wt %) of magnetic or magnetizable impurities in slurry flowing through the magnetic separator are removed during the cutting operation of a workpiece before the magnetic separator needs to be regenerated or cleaned. The efficiency of the magnetic separator at removing magnetic or magnetizable impurities depends on many factors including flow rate through the magnetic separator, the type of magnetic separator, the amount of loading of magnetic or magnetizable impurities in the magnetic separator and the arrangement of the magnetic separator within the recirculating slurry dispense system. Regeneration of the magnetic separator usually comprises one or a combination of the following: washing the magnetic separator using an aqueous solution, agitating the magnetic separator, blowing a high pressure gas through the magnetic separator, and demagnetizing the magnetic separator.

Magnetic or magnetizable impurities that can be removed by the magnetic separator could also come from sources other than the wire. For example, magnetic or magnetizable impurities could come from kerf material due to a ferromagnetic or paramagnetic workpiece, or impurities in the workpiece that are ferromagnetic or paramagnetic. Another source of impurities can be parts of the wiresaw apparatus other than the wire. Magnetic impurities could also come from slurry components or impurities in the slurry components. For example, ferromagnetic or paramagnetic impurities could be released from an abrasive due to the mechanical and chemical wear of the cutting process during operation of the wiresaw apparatus or could be a contaminant in a batch of abrasive material used in the slurry.

Figure 2:
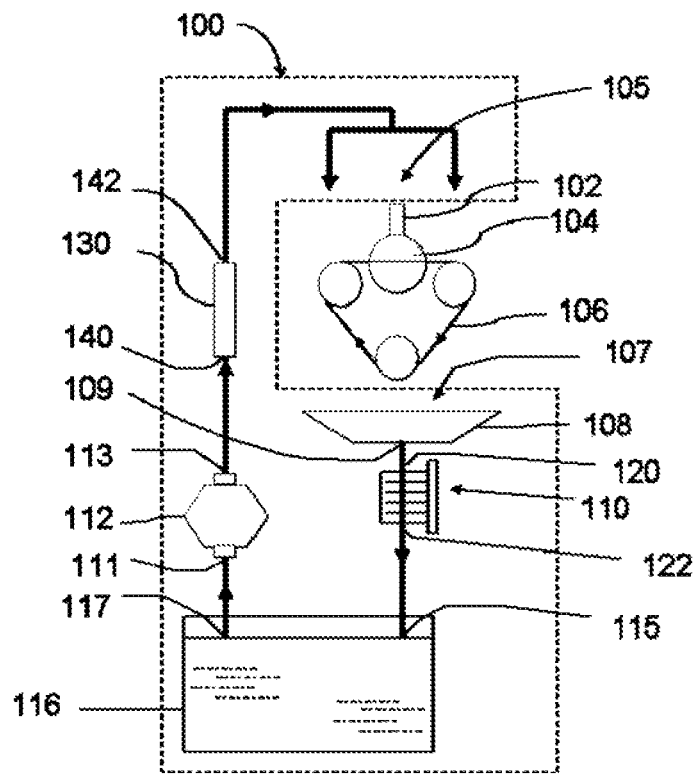
FIG. 2 shows a wiresaw cutting apparatus where the recirculating slurry dispensing system comprises a collector, a magnetic separator, a slurry tank, a pump and a heat exchanger.

FIG. 2 shows an embodiment of the apparatus used in the method of the invention. The recirculating slurry dispensing system 100, shown encircled by the dotted lines defines a slurry flow pathway. The recirculating slurry dispensing system 100 applies an abrasive slurry to the moving wiresaw 106 at application region 105 while the workpiece 104, held by the mount and support head 102, is cut. Slurry flows off of wiresaw 106 and workpiece 104 and back into the recirculating slurry dispensing system at wiresaw slurry egress region 107. The recirculating slurry dispensing system 100 also includes a collector 108 which is positioned to collect used slurry coming from wiresaw slurry egress region 107 of wiresaw 106. Slurry exits collector 108 at collector outlet 109 and flows into magnetic separator 110 through separator inlet 120. Slurry exits separator 110 through separator outlet 122 and flows into slurry tank 116 at tank ingress 115. Slurry flows out of tank 116 through tank egress 117, and into pump 112 via pump inlet 111. Slurry then flows out of pump 112 via pump outlet 113 and into a heat exchanger 130 at exchanger inlet 140. Finally, slurry flows out of heat exchanger 130 through exchanger outlet 142 and back onto wiresaw 106 and workpiece 104 to complete the recirculating loop of recirculating slurry dispensing system 100.

Figure 3:
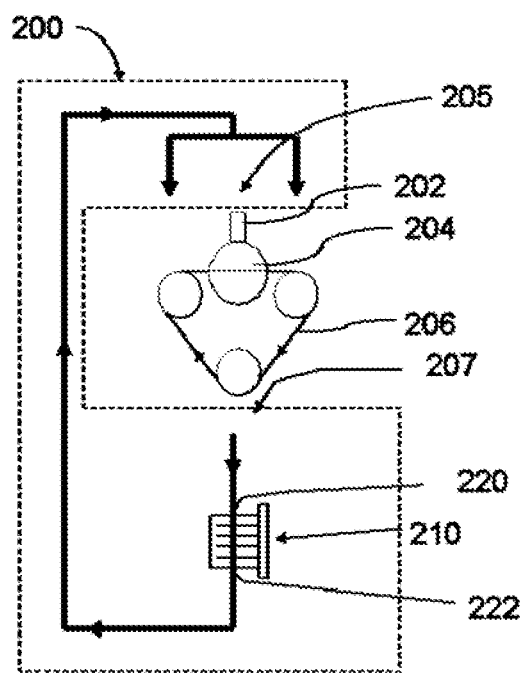
FIG. 3 shows a wiresaw cutting apparatus with a magnetic separator.

FIG. 3 shows a wiresaw cutting apparatus used in a preferred embodiment of the invention. The recirculating slurry dispensing system 200, shown encircled by the dotted lines defines a slurry flow pathway, and applies an abrasive slurry to the moving wiresaw 206 at application region 205 while the workpiece 204, held by the mount and support head 202, is cut. Slurry flows off of wiresaw 206 and workpiece 204 and back into the recirculating slurry dispensing system at wiresaw slurry egress region 207. Slurry flows from wiresaw slurry egress region 207 into magnetic separator 210 through separator inlet 220. Slurry exits magnetic separator 210 through separator outlet 222 and flows back onto wiresaw 206 and workpiece 204 to complete the recirculating loop of recirculating slurry dispensing system 200.

The residence time of the slurry in magnetic separator 220 depends on the size of the inner chamber of the magnetic separator and the flow rate in the recirculating slurry dispensing system 200. Longer residence times can increase the efficiency of the removal of the magnetic or magnetized impurities but may decrease the throughput of the cutting process or be impractical to implement mechanically. For example, a very large magnetic separator may be prohibitively expensive and/or difficult to combine with existing equipment.

Figure 4:
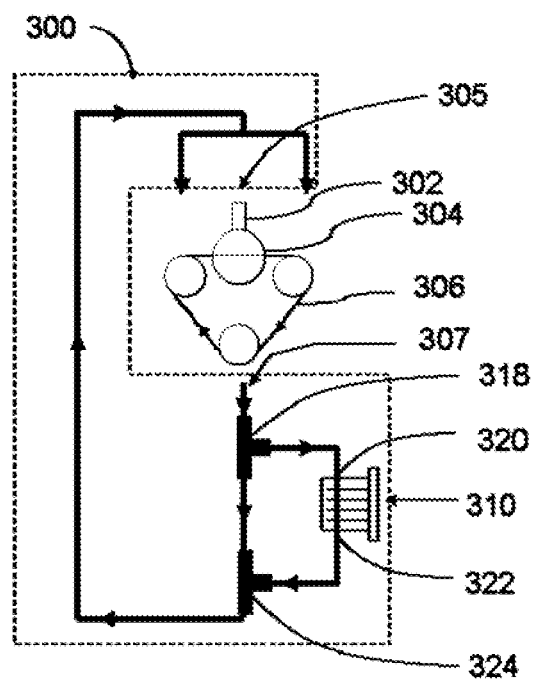
FIG. 4 shows a wiresaw cutting apparatus with a magnetic separator wherein the slurry discharged from the magnetic separator is added back into circulation at a point in the recirculating slurry dispensing system between the point in the system where the stream of slurry exits the magnetic separator and the point in the system where slurry is applied to the wiresaw.

FIG. 4 shows a wiresaw cutting apparatus with a magnetic separator 310 used in an embodiment of the invention. The recirculating slurry dispensing system 300, shown encircled by the dotted lines defines a slurry flow pathway, and applies an abrasive slurry to the moving wiresaw 306 at application region 305 while the workpiece 304, held by the mount and support head 302, is cut. Slurry flows off of wiresaw 306 and workpiece 304 and back into the recirculating slurry dispensing system at wiresaw slurry egress region 307. A portion of the slurry that flows from wiresaw slurry egress region 307 is diverted at diverter 318 and flows into magnetic separator 310 through separator inlet 320. Diverter 318 is positioned between the wiresaw slurry egress region 318, junction 324 and separator inlet 320. The slurry flows out of magnetic separator 310 through separator outlet 322. Slurry flowing from wiresaw slurry egress region 307 that is not sent to magnetic separator 310 is combined with slurry discharged through magnetic separator outlet 322 at junction 324. Junction 324 is positioned between separator outlet 322 and application region 305. Slurry flows from junction 324 back onto wiresaw 306 and workpiece 304 to complete the recirculating loop of recirculating slurry dispensing system 300. The amount of slurry sent through magnetic separator 310 as a percent of the total flow in the recirculating slurry dispensing system is typically about 100% or less (e.g., up to 90%, up to 80%, up to 70%, up to 60%, or up to 50%). The amount of slurry sent through the magnetic separator 310 as a percent of the total volume of flow through the recirculating slurry dispensing system 300 is typically 0% or more (e.g., not less than 10%, not less than 20%, not less than 30%, not less than 40%, or not less than 50%). The amount of slurry flow that is diverted depends on operating needs of the wiresaw cutting process and during a cutting procedure the amount of slurry flow diverted can be changed many times. For example, the amount of flow diverted can be changed to increase the efficiency of the magnetic separator for the removal of magnetic or magnetizable impurities. Another possibility is that no flow, or 0% of the total slurry flow through recirculating slurry dispensing system 300, is diverted at point 318 for the purpose of repair, replacement or regeneration of the magnetic separator 310. The amount of slurry diverted can be controlled by any suitable means. For example, the amount of slurry diverted can be controlled by valves, the bore widths of any tubing, a pump, at or between: diversion point 318 and separator inlet 320; separator outlet 322 and merging point 324; or diversion point 318 and merging point 324.

Figure 5:
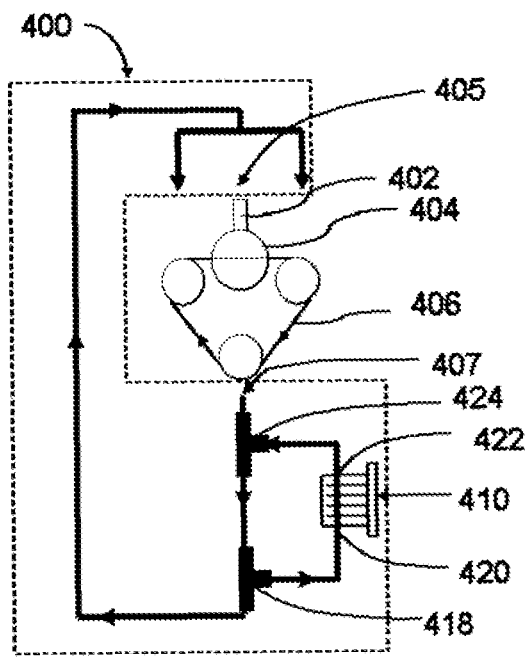
FIG. 5 shows a wiresaw cutting apparatus with a magnetic separator wherein the slurry discharged from the magnetic separator is added back into circulation at a point in the recirculating slurry dispensing system between the point in the system where the stream of slurry exits the magnetic separator and the point in the system where the used slurry is conveyed from the workpiece.

FIG. 5 shows a wiresaw cutting apparatus with a magnetic separator 410 used in an embodiment of the invention. The recirculating slurry dispensing system 400, shown encircled by the dotted lines defines a slurry flow pathway, and applies an abrasive slurry to the moving wiresaw 406 at application region 405 while the workpiece 404, held by the mount and support head 402, is cut. Slurry flows off of wiresaw 406 and work-piece 404 and back into the recirculating slurry dispensing system at wiresaw slurry egress region 407. A portion of the slurry that flows from wiresaw slurry egress region 407 is diverted at diverter 418 and flows into magnetic separator 410 through separator inlet 420. Diverter 418 is positioned between application region 405, junction 424 and separator inlet 420. The slurry flows out of magnetic separator 410 through separator outlet 422. The slurry discharged from magnetic separator 410 is added back into circulation at junction 424 between separator outlet 422 and wiresaw slurry wiresaw slurry egress region 407. The slurry flowing from wiresaw slurry egress region 407 that is not sent to the magnetic separator 410 flows back to application region 405 completing the recirculating loop of recirculating slurry dispensing system 400. The amount of slurry sent through magnetic separator 410 as a percent of the total flow in the recirculating slurry dispensing system is typically about 100% or less (e.g., up to 90%, up to 80%, up to 70%, up to 60%, or up to 50%). The amount of slurry sent through the magnetic separator 410 as a percent of the total volume of flow through the recirculating slurry dispensing system 400 is typically 0% or more (e.g., not less than 10%, not less than 20%, not less than 30%, not less than 40%, or not less than 50%). The amount of slurry flow that is diverted depends on operating needs of the wiresaw cutting process and during a cutting procedure the amount of slurry flow diverted can be changed many times. For example, the amount of flow diverted can be changed to increase the efficiency of the magnetic separator for the removal of magnetic or magnetizable impurities. Another possibility is that no flow, or 0% of the total slurry flow through recirculating slurry dispensing system 400, is diverted at point 418 for the purpose of repair, replacement or regeneration of the magnetic separator 410. The amount of slurry diverted can be controlled by any suitable means. For example, the amount of slurry diverted can be controlled by valves, the bore widths of any tubing, a pump, or any combination of these at or between: diversion point 418 and separator inlet 420; separator outlet 422 and merging point 424; or diversion point 418 and merging point 424.

Figure 6:
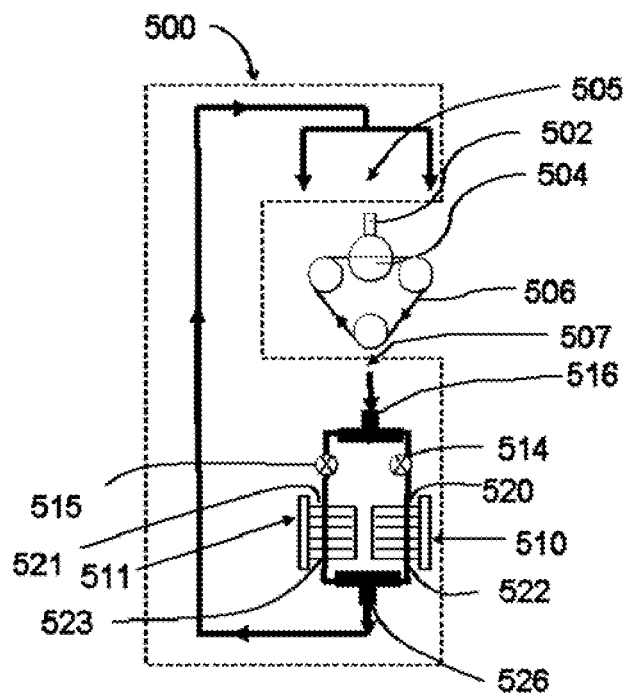
FIG. 6 shows a wiresaw cutting apparatus comprising two magnetic separators arranged in parallel where the flow of slurry can be diverted to one, two or both of the magnetic separators.

FIG. 6 shows a wiresaw cutting apparatus with two magnetic separators 510, which are arranged in parallel. The recirculating slurry dispensing system 500, shown encircled by the dotted lines defines a slurry flow pathway, and applies an abrasive slurry to the moving 510 wiresaw 506 at application region 505 while the workpiece 504, held by the mount and support head 502, is cut. Slurry flows off of wiresaw 506 and workpiece 504 and back into the recirculating slurry dispensing system at wiresaw slurry egress region 507. Slurry flows from wiresaw slurry egress region 507 to splitter 516. Splitter 516 is positioned between wiresaw slurry egress region 507 and separator inlets 520 and 521. From splitter 516 slurry is sent into magnetic separator 510 through inlet 520 and into magnetic separator 511 through inlet 521. The slurry is discharged from magnetic separator 510 through outlet 522 and combined with slurry that is discharged from magnetic separator 511 through outlet 523 at combiner 526. Combiner 526 is positioned between application region 505, separator outlet 522 and separator outlet 523. The slurry combined at combiner 526 flows back onto wiresaw 506 and workpiece 504 to complete the recirculating loop of recirculating slurry dispensing system 500. The percentage of total flow through any one of the magnetic separators 510 and 520 is up to 100% (e.g., up to 90%, up to 80%, up to 60%, or up to 50%) of the total flow in the recirculating slurry dispensing system 500. The percentage of total flow through any one magnetic separator is about 0% or more (e.g., not less than 10%, not less than 20%, not less than 30%, not less than 40%, or not less than 50%) of the total flow in the recirculating slurry dispensing system. The percentage of flow through any one of the magnetic separators 510 and 511 can be controlled by any suitable flow control device. For example, the percentage of flow can be controlled by valves, the bore width of tubes, a pump, or any combination of these at or between: splitting point 516 and inlets 520 and 521; or combiner 526 and outlets 522 and 523. Preferably the percentage of slurry flow sent through magnetic separators 510 and 511 is controlled by valve 514, located between splitter 516 and separator inlet 520, and valve 515 located between splitting point 516 and separator inlet 521. The percentage of slurry flow sent to magnetic separator 510 and 511 can be independently manipulated to increase the efficiency of the magnetic separator for the removal of magnetic or magnetizable impurities. A possibility is that the percentage of flow diverted to one of the magnetic separators 510 or 511 is equal to 0% of the total flow in the recirculating slurry dispensing system 500 for the purpose of repair, replacement or regeneration of that magnetic separator with no flow passing through it. A variation of the configuration of FIG. 6 is to have more than 2 magnetic separators in parallel (e.g., 3 or more, 4 or more, 5 or more, or 6 or more). The flow can be diverted to a subset of magnetic separators as described above for the two magnetic separator configuration and the sum of the total flow through the individual magnetic separators is equal to the total flow through the recirculating slurry dispensing system. For example, for a configuration that has "n" magnetic separators, where n is an integer (i) greater than or equal to 1, and $F_n$ is the percent of the total flow of the recirculating slurry dispensing system: the following equation operates:

$$\sum_{i=1}^{N} F_n = 100\%$$

Where:

$$100\% \geq F_n \geq 0\%$$

Figure 7:
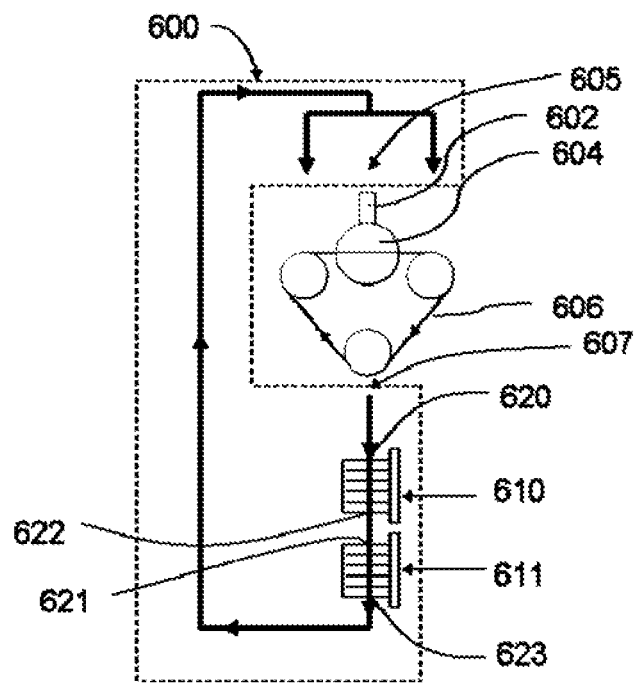
FIG. 7 shows a wiresaw cutting apparatus comprising two magnetic separators arranged in a series.

FIG. 7 shows a wiresaw cutting apparatus with two magnetic separators 610 and 611 arranged in a series for use in an embodiment of the invention. The recirculating slurry dispensing system 600, shown encircled by the dotted lines defines a slurry flow pathway, and applies an abrasive slurry to the moving wiresaw 606 at application region 605 while the workpiece 604, held by the mount and support head 602, is cut. Slurry flows off of wiresaw 606 and workpiece 604 and back into the recirculating slurry dispensing system at wiresaw slurry egress region 607. Slurry flows from wiresaw slurry egress region 607 into magnetic separator 610 through separator inlet 620 and exits magnetic separator 610 through separator outlet 622. Subsequently, the discharged slurry coming from separator outlet 622 is sent to separator inlet 621 and through magnetic separator 611. Slurry exits magnetic separator 611 through separator outlet 623 and flows back onto wiresaw 606 and workpiece 604 to complete the recirculating loop of recirculating slurry dispensing system 600.

The separators 610 and 611 can be of substantially similar design or each separator can be of a different design. For example, it may be desirable to have a magnetic separator 610 that is more selective for the removal of large magnetic or magnetizable impurities located between wiresaw slurry egress region 607 and magnetic separator 611, which could be more selective to the removal of finer magnetic or magnetizable impurities. A variation of the configuration of FIG. 7 is to have more than 2 magnetic separators arranged in a series (e.g., 3 or more, 4 or more, 5 or more, or 6 or more).

Figure 8:
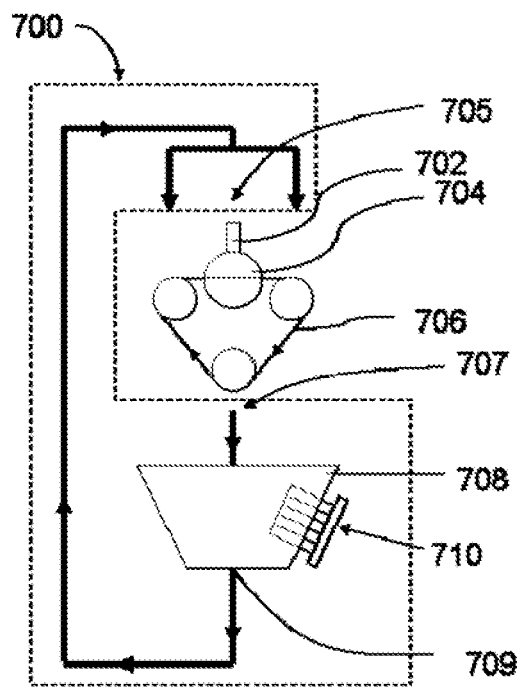
FIG. 8 shows a wiresaw cutting apparatus with a magnetic separator wherein the recirculating slurry dispensing system includes a collector and the magnetic separator is immersed partially in the collector.

FIG. 8 shows a wiresaw cutting apparatus with magnetic separator 710 used in an embodiment of the invention. The recirculating slurry dispensing system 700, shown encircled by the dotted lines defines a slurry flow pathway, and applies an abrasive slurry to the moving wiresaw 706 at application region 705 while the workpiece 704, held by the mount and support head 702, is cut. Slurry flows off the wiresaw 706 and workpiece 704 and back into the recirculating slurry dispensing system at wiresaw slurry egress region 707. The recirculating slurry dispense system 700 also includes a collector 708 which is positioned to collect used slurry coming from wiresaw slurry egress region 707. Slurry exits collector 708 at collector outlet 709 and back onto wiresaw 706 and workpiece 704 to complete the recirculating loop of recirculating slurry dispensing system 700. The magnetic separator 710 is immersed in the collector 708 so that at least some of the slurry conveyed from the wiresaw 706 and workpiece 704 is sent through the magnetic separator 710. The magnetic separator can be immersed partially or fully in the collector 708. The magnetic separator can be immersed in the collector to contact slurry from any location such as the sides, the top or the bottom. Preferably, the magnetic separator is located close to the collector outlet 709. One or more magnetic separators can be used. One or more of the magnetic separators can be removed for repair, replacement or regeneration of the magnetic separator during operation of the wiresaw cutting apparatus.

Figure 9:
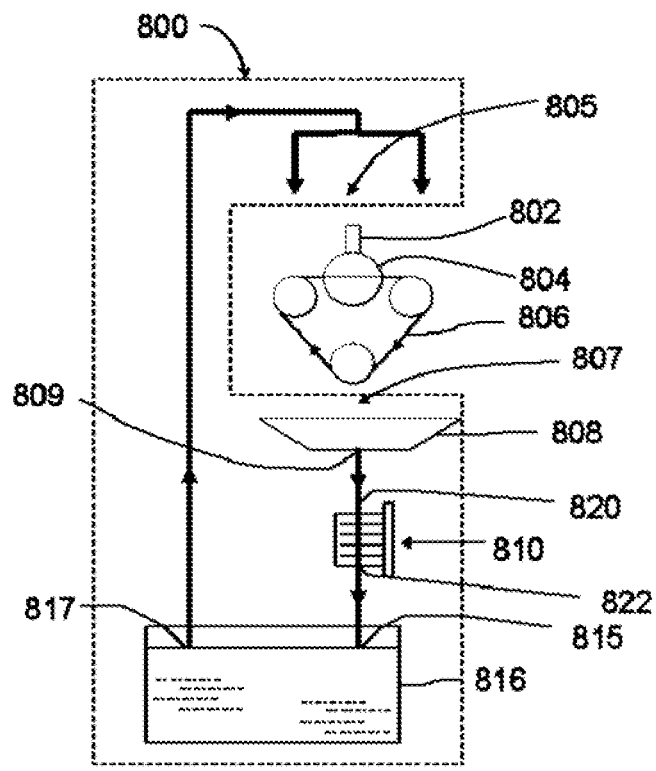
FIG. 9 shows a wiresaw cutting apparatus with a magnetic separator wherein the recirculating slurry dispensing system includes a collector for collecting used slurry from the work piece for diversion into the magnetic separator, and includes a slurry tank that acts as a reservoir for the slurry and as a receiver for slurry discharged from the magnetic separator.

FIG. 9 shows a wiresaw cutting apparatus with a magnetic separator 810 used in an embodiment of the invention. The apparatus consists of a recirculating slurry dispensing system 800, shown encircled by the dotted lines, which defines a slurry flow pathway. The recirculating slurry dispensing system 800 applies an abrasive slurry to the moving wiresaw 806 at application region 805 while the workpiece 804, held by the mount and support head 802, is cut. Slurry flows off of wiresaw 806 and workpiece 804 at wiresaw slurry egress region 807. The recirculating slurry dispensing system 800 also includes a collector 808, which is positioned to collect used slurry coming from wiresaw slurry egress region 807. Slurry exits collector 808 at collector outlet 809 and flows into magnetic separator 810 through separator inlet 820. Slurry exits separator 810 through separator outlet 822 and flows into slurry tank 816 at tank ingress 815. Slurry flows out of tank 816 through tank egress 817 and back onto wiresaw 806 and workpiece 804 to complete the recirculating loop of recirculating slurry dispensing system 800.

Figure 10:
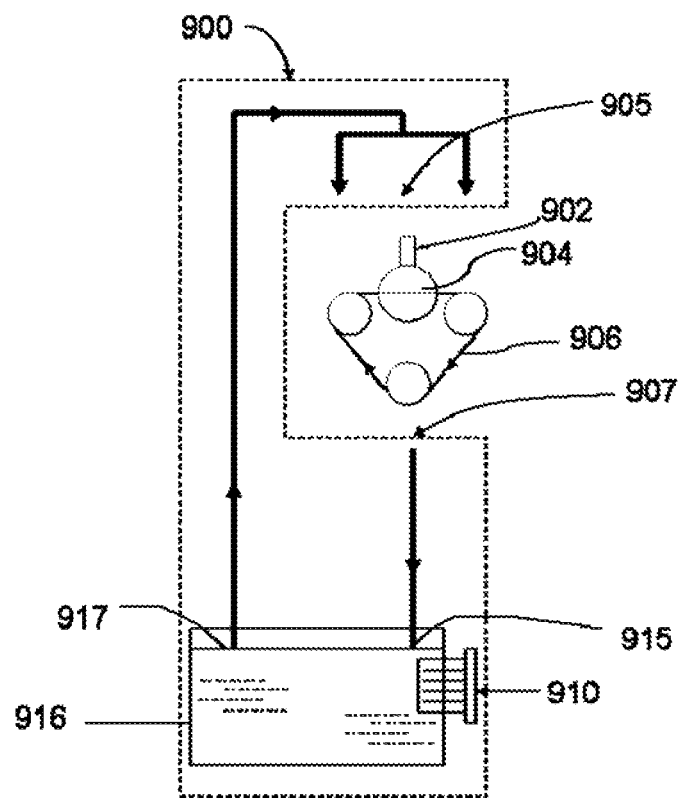
FIG. 10 shows a wiresaw cutting apparatus with a magnetic separator wherein the recirculating slurry dispensing system includes a slurry tank and the magnetic separator is immersed partially in the slurry tank.

FIG. 10 shows a wiresaw cutting apparatus with a magnetic separator 910 used in an embodiment of the invention. The apparatus consists of a recirculating slurry dispensing system 900, shown encircled by the dotted lines, which defines a slurry flow pathway. The recirculating slurry dispensing system 900 applies an abrasive slurry to the moving wiresaw 906 at application region 905 while the workpiece 904, held by the mount and support head 902, is cut. Slurry flows off of wiresaw 906 and workpiece 904 and back into the recirculating slurry dispensing system at wiresaw slurry egress region 907. Slurry flows into slurry tank 916 at tank ingress 915. Slurry flows out of tank 916 through tank egress 917 and back onto wiresaw 906 and workpiece 904 to complete the recirculating loop of recirculating slurry dispensing system 900. The magnetic separator is immersed in the slurry tank 916 so that at least some of the slurry passes through the magnetic separator 910. There may be multiple inlets and outlets to the magnetic separator. The interior of the magnetic separator may consist of the entire interior of the slurry tank so that the inlet to the magnetic separator is the same component as the tank ingress 915, and the outlet to the magnetic separator is the same component as the tank egress 917.

The magnetic separator 910 can be immersed partially or fully in slurry tank 916. The magnetic separator can be immersed in the slurry tank 916 to contact slurry from any location such as the sides, the top or the bottom. Preferably, the magnetic separator is located close to tank ingress 917 where the slurry is conveyed into the slurry tank 916. One or more magnetic separators can be used. One or more of the magnetic separators can be removed for repair, replacement or regeneration of the magnetic separator during operation of the wiresaw cutting apparatus.

Figure 11:
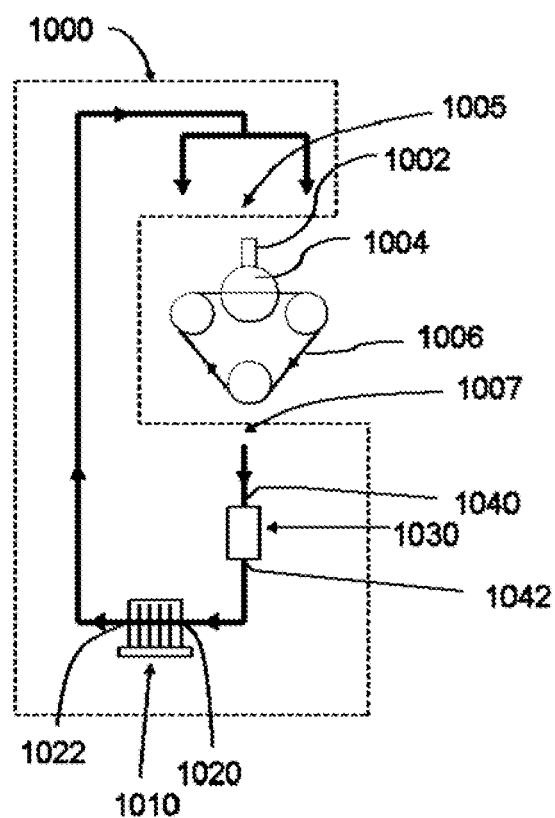
FIG. 11 shows a wiresaw cutting apparatus with a magnetic separator wherein the recirculating slurry dispensing system includes a heat exchanger.

FIG. 11 shows an embodiment of the apparatus used in the method of the invention. The apparatus consists of a recirculating slurry dispensing system 1000, shown encircled by the dotted lines, which defines a slurry flow pathway. The recirculating slurry dispensing system 1000 applies an abrasive slurry to the moving wiresaw 1006 at application region 1005 while the workpiece 1004, held by the mount and support head 1002, is cut. Slurry flows off of wiresaw 1006 and workpiece 1004 and back into the recirculating slurry dispensing system at wiresaw slurry egress region 1007. Slurry flows from wiresaw slurry egress region 1007 into heat exchanger 1030 through exchanger inlet 1040. Slurry flows out of heat exchanger 1030 through exchanger outlet 1042 and into magnetic separator 1010 through separator inlet 1020. Finally, slurry flows from separator outlet 1022 and back onto wiresaw 1006 and workpiece 1004 to complete the recirculating loop of recirculating slurry dispensing system 1000.

Figure 12:
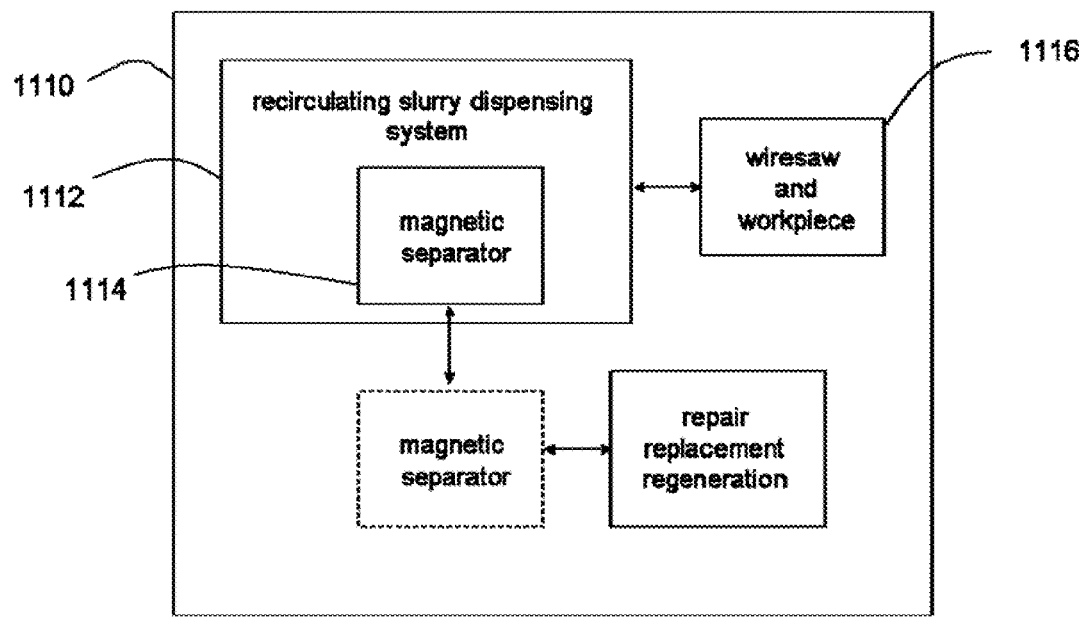
FIG. 12 shows components used in the invention where the magnetic separator is taken out of the recirculating slurry dispensing system for cleaning while the wiresaw is in operation.

FIG. 12 provides a schematic representation of various components of a wiresaw cutting system 1110 used in the methods of the invention. A recirculating slurry dispensing system 1112, as utilized in the present invention comprises a magnetic separator 1114. An abrasive slurry flows onto a wiresaw and workpiece 1116 and flows away from wiresaw and workpiece 1116 completing a slurry recycling loop using the recirculating slurry dispensing system 1112. The magnetic separator 1114 can be removed for repair, exchanged with a different separator or regeneration while the wiresaw apparatus is in use. Regeneration generally involves one, or a combination of the following; washing the magnetic separator using an aqueous solution, agitating the magnetic separator or demagnetizing the magnetic separator. The repaired, exchanged or regenerated magnetic separator can subsequently be reattached at the same position within the recirculating slurry dispensing system.

Figure 13:
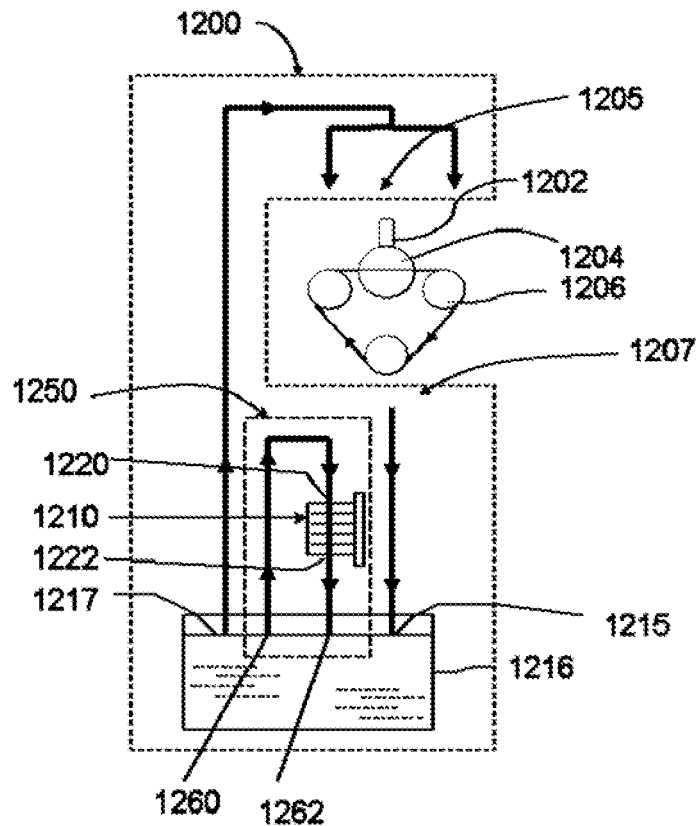
FIG. 13 shows a wiresaw cutting apparatus with a magnetic separator wherein the recirculating slurry dispensing system includes a slurry tank and a separator slurry loop adapted to convey slurry from the slurry tank, through the magnetic separator and back to the slurry tank.

FIG. 13 shows a wiresaw cutting apparatus with a magnetic separator 1210 used in an embodiment of the invention. The recirculating slurry dispensing system 1200, shown encircled by the dotted lines defines a slurry flow pathway, and applies an abrasive slurry to the moving wiresaw 1206 at application region 1205 while the workpiece 1204, held by the mount and support head 1202, is cut. Slurry flows off of wiresaw 1206 and workpiece 1204 and back into the recirculating slurry dispensing system at wiresaw slurry egress region 1207. Slurry flows into slurry tank 1216 at tank ingress 1215. A portion of the slurry collected in slurry tank 1216 is diverted to a separator slurry loop 1250, show encircled by the dashed lines, through the ingress to separator slurry loop 1260, enters magnetic separator 1210 through separator inlet 1220, exits the magnetic separator through separator outlet 1222 and is discharged back into the slurry tank at egress to separator slurry loop 1262. Slurry flows out of tank 1216 through tank egress 1217 and back onto wiresaw 1206 and workpiece 1204 to complete the recirculating loop of recirculating slurry dispensing system 1200.

The amount of slurry sent through magnetic separator 1210 as a percent of the total flow in the recirculating slurry dispensing system is typically about 1000% or less (e.g., up to 900%, up to 800%, up to 700%, up to 600%, up to 500%, up to 400%, up to 300%, up to 200%, or up to 100%). The amount of slurry sent through the magnetic separator 1210 as a percent of the total volume of flow through the recirculating slurry dispensing system 1200 is typically 0% or more (e.g., 10% or greater, 20% or greater, 30% or greater, 40% or greater, 50% or greater, 100% or greater, 200% or greater, 300% or greater, 400% or greater, or 500% or greater). The amount of slurry flow that is diverted depends on operating needs of the wiresaw cutting process and during a cutting procedure the amount of slurry flow diverted can be changed many times. For example, the amount of flow diverted can be changed to increase the efficiency of the magnetic separator for the removal of magnetic or magnetizable impurities. Another possibility is that no flow, or 0% of the total slurry flow through recirculating slurry dispensing system 1200, is diverted to the magnetic separator 1210 for the purpose of repair, replacement or regeneration of the magnetic separator 1210. The amount of slurry diverted can be controlled by any suitable means. For example, the amount of slurry diverted can be controlled by valves, the bore widths of any tubing, a pump, or any combination of these at or between: the ingress to separator slurry loop 1260 and separator inlet 1220; or the separator outlet 1222 and egress to separator slurry loop 1262.

FIG. 14 shows a wiresaw cutting apparatus with a magnetic separator 1310 used in an embodiment of the invention. The recirculating slurry dispensing system 1300, shown encircled by the dotted lines defines a slurry flow pathway, and applies an abrasive slurry to the moving wiresaw 1306 at application region 1305 while the workpiece 1304, held by the mount and support head 1302, is cut. Slurry flows off of wiresaw 1306 and workpiece 1304 and back into the recirculating slurry dispensing system at wiresaw slurry egress region 1307. Slurry flows from wiresaw slurry egress region 1307 into magnetic separator 1310 through separator inlet 1320. Slurry exits magnetic separator 1310 through separator outlet 1322 and flows into slurry tank 1316 at tank ingress 1315. A portion of the slurry collected in slurry tank 1316 is diverted to heat exchanger slurry loop 1380, shown encircled by the dashed lines, through the ingress to heat exchanger slurry loop 1390, enters heat exchanger 1330 through exchanger inlet 1340, exits the heat exchanger through exchanger outlet 1342 and is discharged back into the slurry tank at egress to heat exchanger slurry loop 1392. Slurry flows out of tank 1316 through tank egress 1317 and back onto wiresaw 1306 and workpiece 1304 to complete the recirculating loop of recirculating slurry dispensing system 1300.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for removing magnetic or magnetized contaminants from a wiresaw cutting slurry during a wiresaw cutting process comprising the steps of:
applying an abrasive slurry to a moving wiresaw from a recirculating slurry dispensing system, wherein the recirculating slurry dispensing system includes a heat exchanger;
cutting a workpiece with the moving wiresaw and the applied abrasive slurry; conveying abrasive slurry from the workpiece back into the recirculating slurry dispensing system;
sending at least a portion of the slurry through at least one magnetic separator to remove magnetic or magnetized contaminants from the slurry; and discharging the slurry sent through the magnetic separator back into circulation within the recirculating slurry dispensing system.

2. The method claim 1 wherein the at least one magnetic separator comprises two or more magnetic separators arranged in parallel.

3. The method of claim 1 wherein the at least one magnetic separator comprises two or more magnetic separators arranged in a series.

4. The method of claim 1 wherein the recirculating slurry dispensing system includes a collector to collect used slurry from the workpiece and the magnetic separator is at least partially immersed in the collector.

5. The method of claim 1 wherein the recirculating slurry dispensing system includes a slurry tank and the magnetic separator is at least partially immersed in the slurry tank.

6. The method of claim 1 wherein the heat exchanger is located between the point in the system where used slurry is conveyed from the workplace and the point where the used slurry enters the magnetic separator.

7. The method of claim 1 wherein the workpiece is selected from the group consisting of a silicon ingot, a polysilicon ingot, a gallium arsenide ingot, a ceramic ingot, a quartz ingot, a silicon dioxide ingot, and a glass ingot.

8. The method of claim 1 wherein the recirculating slurry dispensing system includes a slurry tank and a separator slurry loop adapted to convey slurry from the slurry tank through the magnetic separator and back to the slurry tank.

9. A wiresaw cutting apparatus comprising: a mount and support head adapted to hold a workpiece;
a wiresaw positioned relative to the mount and support head such that the workpiece can be brought into contact with the wiresaw when in operation;
an application region for applying slurry to the wiresaw from a recirculating slurry dispensing system, the application region being positioned and adapted to deliver a polishing slurry to the wiresaw, the recirculating slurry dispensing system defining a slurry flow pathway;
a wiresaw slurry egress region adapted to direct slurry off of the wiresaw and mounted workpiece and back into the recirculating slurry dispensing system;
the recirculating dispensing system comprising at least one magnetic separator for removing magnetic or magnetizable contaminants from the slurry;
wherein the magnetic separator comprises an inlet adapted to receive at least a portion of the slurry into the magnetic separator and an outlet adapted to discharge purified slurry back into circulation within the recirculating slurry dispensing system, and wherein the recirculating slurry dispensing system further comprises:

(a) a diverter, positioned between the wiresaw slurry egress region, and the separator inlet, and adapted for diverting at least a portion of the slurry to the magnetic separator, (b) a junction, positioned between the diverter, the outlet of the magnetic separator and the application region, and adapted for combining slurry discharged from the outlet of the magnetic separator and the portion of slurry not diverted to the magnetic separator, back into circulation at a region in the recirculating slurry dispense system between the junction and the application region.

10. A wiresaw cutting apparatus comprising:

a mount and support head adapted to hold a workpiece;

a wiresaw positioned relative to the mount and support head such that the workpiece can be brought into contact with the wiresaw when in operation;

an application region for applying slurry to the wiresaw from a recirculating slurry dispensing system, the application region being positioned and adapted to deliver a polishing slurry to the wiresaw, the recirculating slurry dispensing system defining a slurry flow pathway;

a wiresaw slurry egress region adapted to direct slurry off of the wiresaw and mounted workpiece and back into the recirculating slurry dispensing system;

the recirculating dispensing system comprising at least one magnetic separator for removing magnetic or magnetizable contaminants from the slurry;

wherein the magnetic separator comprises an inlet adapted to receive at least a portion of the slurry into the magnetic separator and an outlet adapted to discharge purified slurry back into circulation within the recirculating slurry dispensing system, and wherein the recirculating slurry dispensing system further comprises;

(a) two or more magnetic separators arranged in parallel, (b) a splitter, positioned between the wiresaw slurry egress region and the inlets of the magnetic separators, and adapted for sending the slurry added back into circulation at the wiresaw slurry egress region to the inlets of the magnetic separators;

(c) a combiner, positioned between the application region and the magnetic separator outlets, and adapted for combining the purified slurry discharged from the magnetic separator back into recirculation within the recirculating slurry dispensing system.

11. The wiresaw apparatus as in claim 9 wherein the recirculating slurry dispensing system further comprises two or more magnetic separators arranged in a series.

12. The wiresaw apparatus as in claim 9 wherein the recirculating slurry dispensing system further comprises; (a) a collector, positioned and adapted for collecting slurry from the wiresaw slurry egress region, (b) a collector outlet, positioned in the collector adapted for discharging the collected slurry back into circulation within the slurry dispensing system; and the magnetic separator is at least partially immersed in the collector and is adapted for purifying at least a portion of the slurry flowing through the recirculating slurry dispensing system.

13. The wiresaw apparatus as in claim 9 wherein the recirculating slurry dispensing system further comprises:

(a) a slurry tank, adapted to provide a reservoir for slurry, (b) a slurry tank ingress, positioned between the wiresaw slurry egress region and slurry tank and adapted for conveying slurry into the slurry tank, (c) a slurry tank egress, positioned between the slurry tank and application region and a adapted to allow slurry to flow from the slurry tank to the application region, a separator slurry loop, (d) an ingress to separator slurry loop, positioned between the slurry tank and the separator inlet and adapted for diverting slurry from the slurry tank to the separator slurry loop, (e) an egress to separator slurry loop positioned between the separator outlet and the slurry tank and adapted to discharge slurry from the separator loop back into the slurry tank.

14. The wiresaw apparatus as in claim 13 wherein the recirculating slurry dispensing system further comprises;

a) a heat exchanger slurry loop, (b) a heat exchanger, (c) an exchanger inlet positioned and adapted for conveying slurry into the heat exchanger, (d) an exchanger outlet positioned and adapted for conveying slurry out of the heat exchanger, (e) an ingress to heat exchanger slurry loop positioned between the slurry tank and exchanger inlet and adapted for conveying a portion of the slurry in the slurry tank to the heat exchanger slurry loop, (f) an egress to heat exchanger slurry loop positioned between the slurry tank and the exchanger outlet and adapted for discharging slurry in the heat exchanger slurry loop back into the slurry tank.

15. The wiresaw apparatus as in claim 13 wherein the recirculating slurry dispensing system further comprises;

(a) a pump, (b) a heat exchanger, (c) a pump inlet, adapted and positioned to allow slurry to flow into the pump from the slurry tank, (d) a pump outlet, adapted and positioned to allow slurry to flow out of the pump to the heat exchanger, (e) an exchanger inlet positioned and adapted for conveying slurry into the heat exchanger from the pump, (f) an exchanger outlet positioned and adapted for conveying slurry out of the heat exchanger to the application region.

* * * * *